(12) United States Patent
Davidson

(10) Patent No.: US 10,308,083 B2
(45) Date of Patent: Jun. 4, 2019

(54) FLAT FREE TIRE

(71) Applicant: Daniel Shane Sheibani Davidson, Los Angeles, CA (US)

(72) Inventor: Daniel Shane Sheibani Davidson, Los Angeles, CA (US)

( * ) Notice: Subject to any disclaimer, the term of this patent is extended or adjusted under 35 U.S.C. 154(b) by 323 days.

(21) Appl. No.: 15/231,958

(22) Filed: Aug. 9, 2016

(65) Prior Publication Data

US 2018/0043740 A1    Feb. 15, 2018

(51) Int. Cl.
*B60C 19/12* (2006.01)
*B29D 30/06* (2006.01)
*B60C 5/20* (2006.01)

(52) U.S. Cl.
CPC ........ *B60C 19/122* (2013.01); *B29D 30/0685* (2013.01); *B60C 5/20* (2013.01); *B29D 2030/0686* (2013.01); *B29D 2030/0695* (2013.01)

(58) Field of Classification Search
CPC ....... B60C 19/00; B60C 19/12; B60C 19/122; B60C 19/125; B60C 19/127
See application file for complete search history.

(56) References Cited

U.S. PATENT DOCUMENTS

| 8,726,955 B2 * | 5/2014 | Majumdar | B29D 30/04 |
| | | | 152/154.1 |
| 2011/0259497 A1 * | 10/2011 | Borot | B60C 23/0493 |
| | | | 152/450 |

* cited by examiner

*Primary Examiner* — Justin R Fischer
(74) *Attorney, Agent, or Firm* — Dunlap Bennett & Ludwig PLLC

(57) ABSTRACT

A self-sealing pneumatic tire having at least one cohesive sandwich radially inward of the pneumatic tire is provided. The at least cohesive sandwich may include a cohesive material under pressure, facilitating a recovery capacity upon being pierced by a sharp object, whereby the molecules of the cohesive material cohesively reattach, self-sealing any passageway or space created by the sharp object. The self-sealing pneumatic tire may also provide a loculated-diamond-section layer located radially inward of the outer cohesive sandwich, further supporting the self-sealing pneumatic tire. The external rubber tread are disposed along the circumference of the tire in some embodiments can be separate from the surface of the tire yet secured in place by attachments. Once fully utilized, this external rubber tread can be replaced by a new version without having to replace the entire tire.

7 Claims, 3 Drawing Sheets

FLAT FREE TIRE

BACKGROUND OF THE INVENTION

The present invention relates to tires and, more particularly, to a pneumatic radial tire that protects the pneumatic chamber with a novel arrangement of layers of predetermined materials so that the pneumatic radial tire is self-sealing and thus operable even when punctured.

The automobile industry for the most part has been around for over one hundred years. Since the inception of the first automobile, almost all aspects of the technology have gone through a great deal of transformation. However, since the beginning, the tires have had the predisposition to becoming injured as a result of penetration of a sharp object such as a nail into their external walls, allowing the air to escape and rendering the tires flat, debilitating the vehicle. The experience and utilization in the last several decades has shown that Radial Pneumatic Tires are generally great high performance tires for on road and off-road vehicles; however they have a fearsome vulnerability, to becoming flat, in case they are punctured with a sharp object such as a nail. The last several decades have shown that radial pneumatic tires are generally great high performance tires for on-road and off-road vehicles, however they are rendered inoperable when punctured, such as by a nail. To overcome this problem, other inventions such as honey comb and septum tires have been invented which are not pneumatic and thus reduce the performance of on-road vehicles, such as sports cars and other on-road utility everyday vehicles.

The honey comb and other septum type tires are not as light nor as high performance as pneumatic tires because of their reliance on structural material in lieu of compressed air, making them a satisfactory option only for low speed off-road vehicles.

Current puncture resistant pneumatic tires are neither able to contain air for any extended period of time once they are punctured, nor are they able to be driven for any length of time once punctured.

Pneumatic tires are high performance for high speed vehicles but they are very sensitive to damage due to puncture. The Flat Free Tire is self-sealing and can be driven for an extensive period of time, even if it is punctured. The current best practices and the methodology of the manufacture of the pneumatic tire would need to be incorporated into the design that we have proposed. In other words, we do not wish in any way to propose a modification to the best practices, methodologies or manufacturing processes and procedures of pneumatic tires. We simply have proposed several features that can render the pneumatic tire flat-free once fully incorporated into the operational designs at hand.

The side walls of most of the tires are soft and not sturdy or strong enough to tolerate the weight of the vehicle once the air pressure has drastically diminished as a result of a puncture. However, in the Flat-Free Tires, the side walls would be manufactured in such way to tolerate the weight of the vehicle, even if it is rendered devoid of air pressure.

As can be seen, there is a need for a pneumatic radial tire that protects the pneumatic chamber with a novel arrangement of layers of predetermined materials so that the pneumatic radial tire is self-sealing and thus operable even when punctured, and so maintaining its high performance traits, hence the Flat Free Tires.

SUMMARY OF THE INVENTION

In one aspect of the present invention, a self-sealing pneumatic radial tire includes a pneumatic tire having an outer circumference and an inner pneumatic chamber; and a first cohesive sandwich disposed between the outer circumference and the inner pneumatic chamber, wherein the first cohesive sandwich comprises a first cohesive material under pressure.

In another aspect of the present invention, the self-sealing pneumatic radial tire includes a pneumatic tire having an outer circumference and an inner pneumatic chamber; a first cohesive sandwich disposed between the outer circumference and the inner pneumatic chamber, wherein the first cohesive sandwich comprises a first cohesive material under pressure; a diamond layer disposed between the first cohesive sandwich and the inner pneumatic chamber, wherein the double-diamond layer is formed from adjacent hollow blocks, each hollow block having a radially outward periphery greater than a radially inward periphery; a second cohesive sandwich disposed between the diamond layer and the inner pneumatic chamber, wherein the second cohesive sandwich comprises a second cohesive material under pressure, wherein each cohesive material is highly cohesive silicone gel-within a rubber bilayer; a plurality of spaced apart vertical septums extending from the second cohesive sandwich through the inner pneumatic chamber, defining a plurality of partitions of said inner pneumatic chamber, wherein each vertical septum provides a through hole, pneumatically connecting adjacent partitions of said inner pneumatic chamber; and at least one sagittal support septum spanning between adjacent partitions of said inner pneumatic chamber.

These and other features, aspects and advantages of the present invention will become better understood with reference to the following drawings, description and claims.

DETAILED DESCRIPTION OF THE INVENTION

Figure 1:
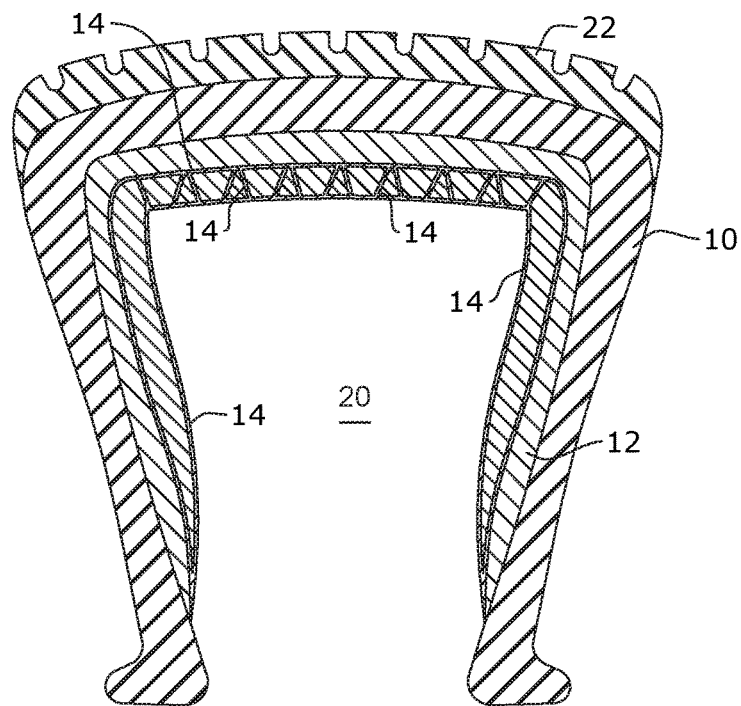
FIG. 1 is a section view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a self-sealing pneumatic tire providing at least one cohesive sandwich radially inward of the pneumatic tire. The at least cohesive sandwich may include a cohesive material under pressure, facilitating a recovery capacity upon being pierced by a sharp object, whereby the molecules of the cohesive material cohesively reattach, self-sealing any passageway or space created by the sharp object. The self-sealing pneumatic tire may also provide a loculated-diamond-section layer located radially inward of the outer cohesive sandwich, further supporting the self-sealing pneumatic tire.

Referring to FIGS. 1 through 5, the present invention may include a flat free tire 10 providing an outer cohesive sandwich 12, a diamond layer 14, an inner cohesive sandwich 16, a plurality of vertical septums 18, an inner pneumatic chamber 20, an external rubber tread 22, and a sagittal support septum 24.

The outer cohesive sandwich 12 is located radially inward of the tire 10. The outer cohesive sandwich 12 may provide three layered elements: two opposing rubber-metal mesh walls (rubber walls) sandwiching a cohesive material. The cohesive material may be a highly cohesive silicone gel or other highly cohesive gel material that self seals once penetrated by a sharp object. The two opposing rubber walls may sandwich the cohesive material so that the cohesive material is under pressure. The thickness of the cohesive material may vary depending the various utilizations and necessities of the particular tire. The outer rubber walls of the tire 10 may be made of a few millimeters of heavy duty rubber encasing metal mesh material.

Figure 2:
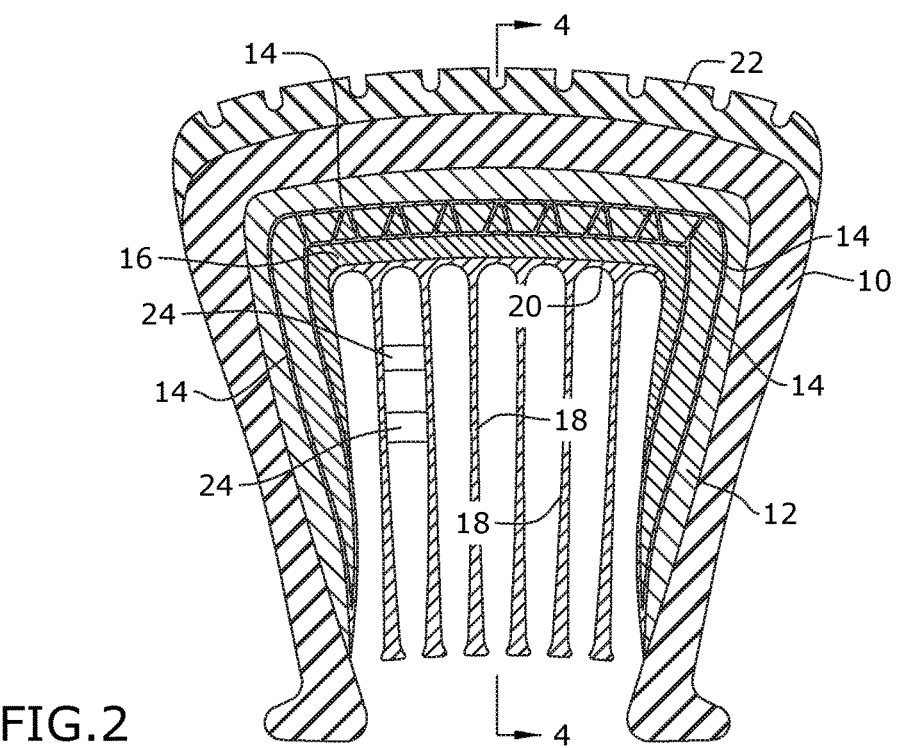
FIG. 2 is a section view of an exemplary embodiment of the present invention.
Figure 3:
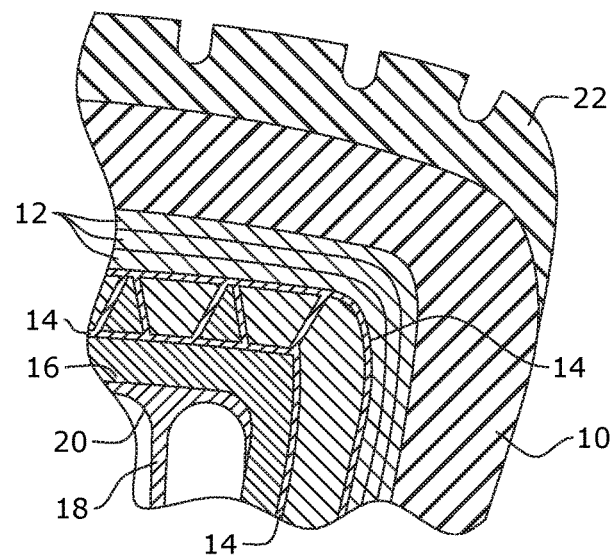
FIG. 3 is an enlarged section view of an exemplary embodiment of the present invention.
Figure 4:
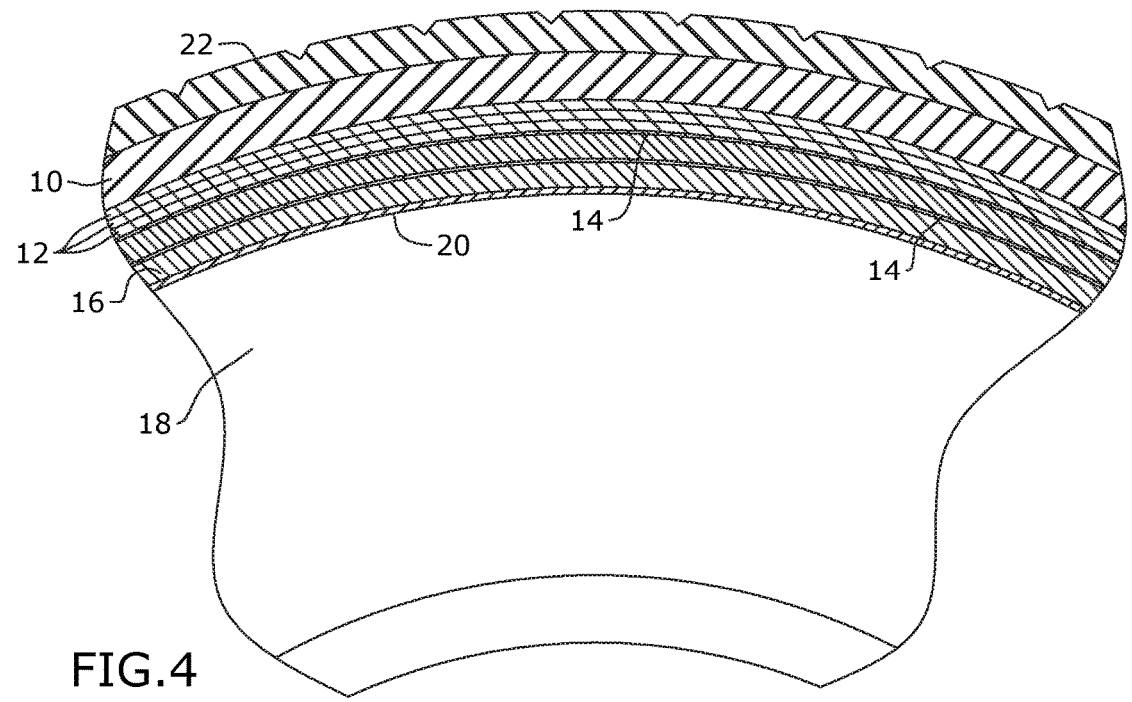
FIG. 4 is a section view of an exemplary embodiment of the present invention, taken along line 4-4 of FIG. 2.

The diamond layer 14 may be located radially inward of the outer cohesive sandwich 12. The diamond layer 14 may form a loculated-diamond-section layer having a radial thickness of approximately about 2-3 inches or more, depending on the thickness of the flat free tire 10, as well as the size and the utilization of the flat free tire 10. The diamond layer 14 may be formed of diamond shaped rubber-mesh-metal-reinforced-blocks, which are empty inside but are attached to each other creating a circular homogeneous body extending from below the outer cohesive sandwich 12 layer all the way toward, in certain embodiments, the inner cohesive sandwich 16 layer. The blocks may be defined by a saw-tooth shapes, as illustrated in FIG. 2. Furthermore, said reinforced blocks may be also designed in such way that they are larger on the radially outward periphery, extending downwardly to a smaller radially inward periphery, protecting the inner aspect (pneumatic chamber 20) of the outer-wall of the flat free tire 10, from puncture by a sharp object, such as a nail. The diamond layer may be a bilayer or multilayer, the diamonds placed adjacent in two layers or more.

In certain embodiments, the inner cohesive sandwich 16 layer may be provided, depending on the utilization of the flat free tire 10 and its potential susceptibility to puncture. The inner cohesive sandwich 16 layer may be disposed immediately and radially below the diamond layer 14. The inner cohesive sandwich may be made up of three layered elements: two opposing rubber-metal mesh walls (rubber walls) sandwiching a cohesive material. The cohesive material may be a highly cohesive silicone gel. The two opposing rubber walls may sandwich the cohesive material so that the cohesive material is under pressure. The two opposing outer rubber walls may be made of a few millimeters of heavy duty rubber encasing metal mesh material.

Figure 5:
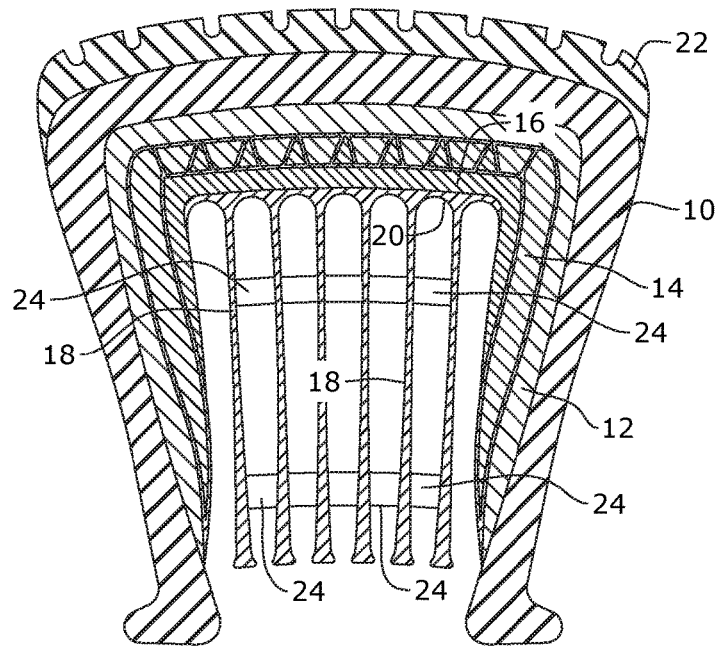
FIG. 5 is a section view of an exemplary embodiment of the present invention.
Figure 6:
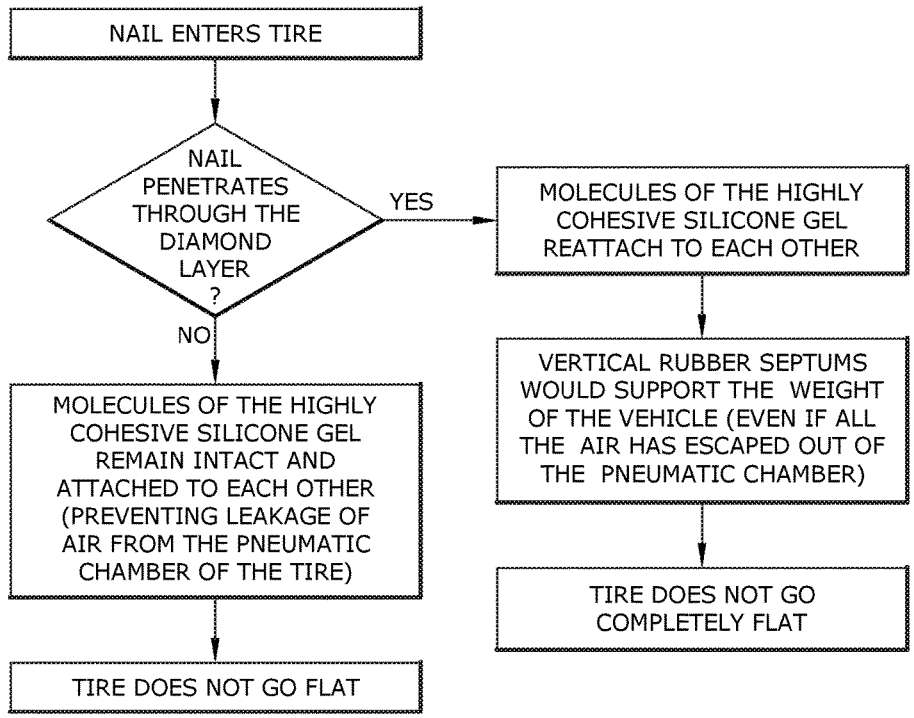
FIG. 6 is a flow chart of an exemplary embodiment of the present invention.

In certain embodiments, the plurality of vertical septums 18 may extend radially from the inner cohesive sandwich 16, through the inner pneumatic chamber 20, partitioning said inner pneumatic chamber 20 into a plurality of air-filled compartments, as illustrated in FIG. 5. In certain embodiments, the vertical septums 18 extend from the inner cohesive sandwich to another portion of the pneumatic chamber 20 (not shown), or the inner aspect of the metal rim. The plurality of vertical septums 18 may be spaced apart for compressively reinforcing the layers of the present invention, while each septum 18 provides a relatively large through hole, facilitating compressed air to pass there through. The vertical septums 18 are thicker at their insertion to the distal portions where they interface with the inner cohesive sandwich 16 layers. Such distal portions may be thick and curved where they could potentially come in contact with the inside aspect of the metal rim. The outer legs of the vertical septum 18 may be made of soft rubber seats to prevent injury to the rim.

In certain embodiments, a plurality of sagittal supports 24 may be provided spanning between adjacent vertical septums 18, as illustrated in FIG. 5, thereby laterally reinforcing said septums 18. In the process of manufacturing the flat free tire 10, the pneumatic radial tire 10 may be engineered by the decision of the respective manufacturer, in a method similar to any other pneumatic tire they produce. Specifically, the outer wall of the inner pneumatic chamber 20 is reinforced with metal rubber mesh on its outside. Otherwise this inner pneumatic chamber 20 is similar in nature to what the current tires are like as far as being the portion that actually is inflated with high-pressured air injection. However, to eliminate the possibility of the tire from becoming flat, the following proposed design is incorporated into the process of manufacturing of the tire.

The external rubber tread 22 are disposed along the circumference of the tire 10 and may be made up of commercial tire rubber material with distinctive threads that demonstrate its unique brand and appearance as well as its high performance nature. The external tread 22 can in some embodiments be separate from the surface of the tire yet secured in place by attachments. Once fully utilized, this external rubber tread 22 can be replaced by a new version without having to replace the entire tire. This will both save money for the owner of the tire, but also save the natural resources of the planet while adding a profit center to the tire manufacturer.

When a sharp object, such as a nail, penetrates through outer cohesive sandwich 12 layer of the tire 10, whether the nail falls off or stays in, the molecules of the cohesive material, which are under pressure, will cohesively reattach to each other, preventing leakage of air from the inner pneumatic chamber 20. Additionally, in certain embodiments, the diamond layer 14 may add radial thickness totaling up to 3-inch or more of space so that a nail/object less than the three inches long or more will not penetrate through to the inner pneumatic chamber 20. Since the diamond layer 14 would be most likely still intact, there would be no disruption of the pneumatic chamber walls, so no air would escape there from. However, if the nail/object is long enough to penetrate through the inner cohesive sandwich 16 it 16 will also self-seal in a similar fashion to the outer cohesive sandwich 12. Finally, the plurality of vertical septums 18 would further support the weight of the vehicle even if all the air has escaped out of the pneumatic chamber 20 due to a puncture. Additionally, it is noteworthy that the lateral walls and medial walls of the tire are protected by the long diamond chambers/blocks of the diamond layer 14 disposed along the inner walls of the lateral and medial wall separating the pneumatic chamber 20 from the outside environment, further adding to the level of protection against nails and other sharp objects.

The flat free tire 10 may be made through a unitary process and not multiple stages. The layers from the outside-in may be pressure molded from melted materials around a metal mesh frame structure. Alternatively, the flat free tire 10 may be made from additive manufacturing.

A method of using the present invention includes the following: providing the flat free tire 10 disclosed above. A user would utilize the flat free tire 10, dimensioned and adapted based on the intended use, size of wheel, and associated vehicle. The flat free tire 10 would be utilized much like other conventional radial pneumatic tires and it functions almost the same except it will not go flat.

Additionally, although the present invention is mainly designed for passenger vehicles and automobiles, they can be modified for use in all types of transportation wheels and function as tires for airplanes, hovercrafts, tanks, army vehicles, tractors, trucks, bulldozers, motorcycles, bicycles, and etc. Also, the present invention can be modified to create playing balls, exercise balls, physical therapy devices and many other devices that can hold air in an inner chamber under pressure and still remain flexible.

Moreover, the cohesive sandwich layers could be used in keeping a gas inside any space that is filled with said gas.

Advantages of the Present Invention

The present invention may be utilized as any other pneumatic radial tire would be. It may be a bit heavier and the pneumatic inner chamber may be a bit smaller but the installation of the tire is identical to any other radial pneumatic tire and it functions almost the same except it will not go flat.

The flat free tire 10 protects the pneumatic chamber with several additional layers and also has optional multiple vertical septums, supported by sagittal support septums that can allow the flat-free tire 10 still to be driven even though it is rendered punctured by a sharp object. The external condensed rubber/metal mesh layer which is the external walls and the entire material of the tire may be made of a solid condensed rubber with metal mesh inside the walls for endurance and weight bearing. The external thread layer may be separated from the air filled chamber by three additional or more layers. The flat free tire 10 makes the horror of suffering a flat tire in a dark, cold, dangerous road a thing of the past, utilizing the combination of at least four protective layers (main four distinctive layers):

1) External-Highly Cohesive-Silicone-Trilayer-Sandwich
2) Loculated-Diamond-Bilayer
3) Inner-Highly Cohesive-Silicone-Trilayer-Sandwich
4) Vertical & Transverse Septums Layer 1 may be the most essential layer. Layers 2-4 may be optional depending on the utility of the tire and its potential possibility and the risk of puncture by sharp objects.

The flat-free tire 10 is intended to solve the flat-tire problem and provide a platform for the new generation of advancements in the creation of Flat-Free High-Performance technology.

The Material/Construction/Manufacture

The rubber material of the flat free tire is made up of a solid highly-cohesive, rubber material similar to the best materials currently utilized in the top high-performance models of tires available in the market. In certain parts of the product, the tire has metal mesh and highly-cohesive-silicone-gel utilized in a strategic manner, rendering it more reliable, flat-free and capable of higher performance.

Specific Components:

10: The Outer Tire:

The condensed rubber/metal mesh external layer—thick-outer layer made up of commercial tire rubber material with distinctive threads that demonstrate its unique brand and appearance as well as its high performance nature. The outer-wall of the tire along all surfaces is made up of condensed solid rubber with metal mesh framing. The metal mesh framing with the solid condensed rubber construction gives the tire the strong, high performance durability associated with this tire construction. The outer threads of the tire are designed in such way that they fit the specific utilization and criteria for the vehicle. For example, they can be designed with sport thread for sport cars and for off-road design for the sport-utility or commercial use. The outer layer is made of rubber and metal mesh.

The design of the product has several distinctive, unique characterizations that sets it apart and makes this product the best available in terms of performance, durability and design much above its other competitors today. In the loculated-diamond-bilayer tire there are several constructively-designed-layers that make the technology unique. The layers from the outside-in are as follows:

12) Outer Silicone Sandwich:

Immediately below the external rubber thread layer of the tire, there is a three layered flattened rubber-highly cohesive silicone gel-rubber; a sandwich-trilayer, made of an inner and outer heavy duty few millimeters thick solid-sandwich-rubber-metal-mesh-layer, while the inside space between the two outer and inner sandwich walls is filled with a few millimeters thick-commercial grade highly-cohesive silicone-gel-layer. the molecules of this highly cohesive silicone gel layer are under pressure between the two rubber layers, and due to their chemical composition have very high cohesive forces, reattaching with each other in case the layer is stabbed with a sharp object such as a nail or even a knife, preventing the escape of any air from the inner pneumatic chamber. I call this rubber-silicone-rubber layer, pneumatic chamber protector which wraps around outer wall of the tire. This layer is extended bilaterally to protect the walls of the tire, in additional to the contact surface, as well.

14) The Diamond Layer (Optional):

The loculated-diamond-bilayer-section which encompasses a ratio of approximately 1/3 (about 1-3 inches or more, depending on the thickness of the tire, as well as the size and the utilization of the tire) of the height of the remainder of the outer layer of the tire. The loculated-diamond-section is made-up of diamond shaped rubber-mesh-metal-reinforced-blocks which are hollow inside but are attached to each other creating a circular homogeneous body extending from below the pneumatic chamber protector layer all the way toward the inner layer. One layer is vacuum filled diamond shaped thick walled rubber catacombs, in an opposing-diamond-bilayer that are placed in rows next to each other along the periphery of the tire with the height of about 1-3 inches. These Loculated-Diamond-Section-Blocks may be also designed in such way that they are larger on the periphery, extending down wards, protecting the inner aspect of the outer-wall of the tire, protecting the tire from injury as a result of sharp penetration.

16) Inner Silicone Sandwich (Optional):

There preferably could be an additional (could be deemed optional in certain tire types) layer of pneumatic chamber protector (rubber-silicone-rubber sandwich trilayer) depending on the utilization of the tire and its potential susceptibility to puncture. If present, this layer can be extended bilaterally to protect the walls of the tire as an additional reinforcement.

18) Vertical Septum Layer (Optional):

This is another optional layer made up of vertical-heavy duty-rubber-metal-mesh-sandwich-layer-reinforcing the bilateral rubber layers with a relatively large hole through the vertical septum for the compressed air to pass through it. The septums are thicker at their insertion to the outside of the inner layers and are also thick and curved where they could potentially come in contact with the inside aspect of the metal rim. The outer legs of the vertical septum are made of soft rubber seats to prevent injury to the rim.

20) Inner Pneumatic Chamber:

The outer wall of the pneumatic chamber may be reinforced with metal rubber mesh on its outside. Otherwise this chamber is similar in nature to what the current tires are like as far as being the portion that actually is inflated with high-pressured air injection.

24) Sagittal Support Septums (Optional)

These go between the vertical (coronal) septums and are there to further reinforce the stability and weight-bearing-tolerance of the vertical septums.

While the above is the general distinction of "flat-free tires" class of tire technology, numerous verifications and modifications can be made available to better suit the needs of each group of consumers. For example; for "off-road" use, all the four main distinctive layers may be included in the tire construction and all layers including the diamond-layer could be reinforced more radically with thicker rubber and metal mesh material. On the other hand, for example, for "high-speed-sports-performance", where the weight of the tire is of immense importance, we would be able to exclude one or more of the original main four distinctive layers, making sure the tire-threads and tire-width support the high-speed turns and are most effective in the maintenance of the center-of gravity.

How the Flat-Free Tire Works:

When a nail enters the tire, it will most likely not be able to penetrate through all of the external layers, in order to get to the pneumatic chamber. The condensed rubber/metal mesh external layer, plus the external-highly cohesive-silicone-trilayer-sandwich, loculated-diamond-bilayer and inner-highly cohesive-silicone-trilayer-sandwich would create an impenetrable protection against most nails and other typical sharps that render pneumatic tires flat. Additionally, the Diamond bilayer adds at least an additional 2-3 inch space between the outside wall of the tire and the pneumatic chamber, which means most nails that are likely to be shorter than the three inches long will not penetrate through the second layer of the silicone sandwich layer.

Even if the nail is able to penetrate the Protective Layers, the nail either falls off or the nail stays in the tire. Either way, the molecules of the highly cohesive silicone gel which are under pressure will cohesively reattach to each other, preventing the leakage of air from the pneumatic chamber of the tire. Since this layer would be most likely still intact, there would be no disruption of the pneumatic wall of the tire, so no air would escape anyways. However, if the nail is long enough to penetrate through the second, internal silicone sandwich layer, it will also self-seal as the outer silicone sandwich layer would. Finally, the vertical and sagittal septums as described would further support the weight of the vehicle even if all the air has escaped out of the pneumatic chamber due to a puncture. Additionally, it is noteworthy that the lateral walls and medial walls of the tire are protected by the long diamond chambers that are along the inner walls of the lateral and medial wall separating the pneumatic chamber from the outside environment, further adding to the level of protection against nails and other sharp objects.

How the Flat-Free Tire is Manufactured:

This class of tire can be modified by the engineers based on the intended use of the tires and their specific vulnerabilities. How thick each layer is designed to be, which layers are included, of what specific materials each layer is made of, and how far each layer extends depends on the specific design of the tire and its intended use. The creation and manufacturing process of this type of tire is to be planned by the engineers and dye makers. The present invention may be created by a manufacturing machine that can make all the layers from rubber by pressure molding melted rubber around a metal mesh frame structure; followed by the injection of the highly cohesive silicone gel in the appropriately planned areas. The engineering aspects of the process are to be designed by the manufacturing company's specific preferences.

However, the particular additional components proposed in the flat free tire 10 design are incorporated into the structure of the tire mostly through the standard pneumatic radial processes and related machinery.

The tire is usually an assembly of numerous components that are built up on a drum and then cured in a press under heat and pressure. Heat facilitates a polymerization reaction that crosslinks rubber monomers to create long elastic molecules. These polymers create the elastic quality that permits the tire to be compressed in the area where the tire contacts the road surface and spring back to its original shape under high-frequency cycles. Typical components used in tire assembly are listed below: inner liner, body ply, sidewall, beads, apex, and tread, which are built is the process of assembling all the components onto a tire building drum through stages. In certain embodiments, tire building operations include the first-stage operation, where inner liner, body plies, and sidewalls are wrapped around the drum, the beads are placed, and the assembly turned up over the bead. In the second stage operation the belt package and tread are applied and the green tire is inflated and shaped.

In the flat free tires, the method of making may conform to the conventional methods, though the sidewalls are reinforced with rubber and metal mesh to reduce the collapse-ability of the tire in case the pneumatic chamber is penetrated and air escapes. In the models that do possess the diamond bilayer, the diamond shaped triangles on the periphery of the tire, supporting the sidewalls, will help keep the sidewalls from collapsing even if no air is left in the pneumatic chamber of the tire.

The external rubber tread 22 are disposed along the circumference of the tire 10 and may be made up of commercial tire rubber material with distinctive threads that demonstrate its unique brand and appearance as well as its high performance nature. The external tread 22 can in some embodiments be separate from the surface of the tire yet secured in place by attachments. Once fully utilized, this external rubber tread 22 can be replaced by a new version without having to replace the entire tire. This will both save money for the owner of the tire, but also save the natural resources of the planet while adding a profit center to the tire manufacturer.

It should be understood, of course, that the foregoing relates to exemplary embodiments of the invention and that modifications may be made without departing from the spirit and scope of the invention as set forth in the following claims.

What is claimed is:

1. A device, comprising:
a pneumatic tire having an outer circumference and an inner pneumatic chamber;
a first cohesive sandwich disposed between the outer circumference and the inner pneumatic chamber, wherein the first cohesive sandwich comprises a first cohesive material under pressure, wherein the first cohesive sandwich is adjacent to and radially inward of the pneumatic tire; and
a diamond layer disposed between the first cohesive sandwich and the inner pneumatic chamber, wherein the diamond layer is formed from adjacent hollow blocks, each hollow block having a radially outward periphery greater than a radially inward periphery.

2. The device of claim 1, further comprising a second cohesive sandwich disposed between the diamond layer and the inner pneumatic chamber, wherein the second cohesive sandwich comprises a second cohesive material under pressure.

3. The device of claim 2, further comprising a plurality of spaced apart vertical septums extending from the second cohesive sandwich through the inner pneumatic chamber, defining a plurality of partitions of said inner pneumatic chamber.

4. The device of claim 3, wherein each vertical septum provides a through hole, pneumatically connecting adjacent partitions of said inner pneumatic chamber.

5. The device of claim 3, further comprising at least one sagittal support septum spanning between adjacent partitions of said inner pneumatic chamber.

6. The device of claim 1, wherein the first cohesive material is a highly cohesive silicone gel-rubber layer.

7. A device, comprising:
   a pneumatic tire having an outer circumference and an inner pneumatic chamber;
   a first cohesive sandwich disposed between the outer circumference and the inner pneumatic chamber, wherein the first cohesive sandwich comprises a first cohesive material under pressure;
   a diamond layer disposed between the first cohesive sandwich and the inner pneumatic chamber, wherein the diamond layer is formed from adjacent hollow blocks, each hollow block having a radially outward periphery greater than a radially inward periphery;
   a second cohesive sandwich disposed between the diamond layer and the inner pneumatic chamber, wherein the second cohesive sandwich comprises a second cohesive material under pressure, wherein each cohesive material is highly cohesive silicone gel-rubber layer;
   a plurality of spaced apart vertical septums extending from the second cohesive sandwich through the inner pneumatic chamber, defining a plurality of partitions of said inner pneumatic chamber, wherein each vertical septum provides a through hole, pneumatically connecting adjacent partitions of said inner pneumatic chamber; and
   at least one sagittal support septum spanning between adjacent partitions of said inner pneumatic chamber.

* * * * *